(12) United States Patent
Takahashi

(10) Patent No.: US 7,038,580 B2
(45) Date of Patent: May 2, 2006

(54) TURN SIGNAL SWITCH DEVICE

(75) Inventor: Atsuo Takahashi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 113 days.

(21) Appl. No.: 10/895,731

(22) Filed: Jul. 21, 2004

(65) Prior Publication Data

US 2005/0029079 A1   Feb. 10, 2005

(30) Foreign Application Priority Data

Jul. 24, 2003  (JP) .............................. 2003-200976
Aug. 8, 2003   (JP) .............................. 2003-290950

(51) Int. Cl.
*B60Q 1/40*   (2006.01)
*H01H 3/16*   (2006.01)

(52) U.S. Cl. ................... 340/475; 340/476; 200/61.27; 200/61.39

(58) Field of Classification Search ................ 340/475, 340/476; 200/61.27, 61.39
See application file for complete search history.

(56) References Cited

U.S. PATENT DOCUMENTS 6,194,676 B1 *  2/2001  Takahashi et al. ....... 200/61.34
6,677,543 B1 *  1/2004  Takahashi et al. ......... 200/61.3

FOREIGN PATENT DOCUMENTS

JP        2001-006495        1/2001

* cited by examiner

*Primary Examiner*—Donnie L. Crosland
(74) *Attorney, Agent, or Firm*—Brinks Hoffer Gilson & Lione

(57) ABSTRACT

A turn signal switch device capable of being miniaturized and of improving a degree of freedom of design is provided. First and second shafts 4a and 4b are formed in a housing 4. A first lever 5 is provided in the first shaft 4a to be rotatable and to proceed to and recede from the rotation orbit of a canceling protrusion 20. A second lever 6 is rotatably provided in the second shaft 4b. The first lever 5 and the second lever 6 are rotatably connected to each other. Furthermore, a second elastic member 8 is provided in the housing 4 together with a first elastic member 7. When an operating lever 3 is in a neutral position, the first lever 5 is maintained in the rotation neutral position by the first elastic member 7 and the second lever 6 is maintained in the rotation neutral position by the second elastic member 8.

10 Claims, 8 Drawing Sheets

TURN SIGNAL SWITCH DEVICE

This application claims the benefit of priority to Japanese Patent Application No. 2003-200976 and 2003-290950, herein incorporated by reference.

BACKGROUND OF THE INVENTION

1. Field of the Invention

The present invention relates to a turn signal switch device attached to a steering column of a vehicle and used as a direction indicator, and in particular, to a canceling mechanism of returning an operating lever to a neutral position.

2. Description of the Related Art

According to a turn signal switch device, the base end of an operating lever is rotatably supported to a housing integrated with a steering column and the tip of the operating lever rotates to a direction indicating position between the right and the left in a neutral position to turn on and off lamps for a left turn signal and a right turn signal. According to the above-mentioned turn signal switch device, in order to maintain the operating lever to be in three positions of the right and left direction indicating positions and the neutral position, a cam surface is provided on the internal surface of the housing, and a driving body engaged with the cam surface is provided in the operating lever with a spring inserted thereinto. Also, when a handle is rotated in a direction reverse to the indicating direction, in a state where the operating lever is rotated to a direction indicating position between the right and the left, a canceling mechanism for automatically returning the operating lever to the neutral position is attached to the turn signal switch device (refer to the patent document).

The structure of the conventional turn signal switch device will now be described with reference to the drawings.

FIG. 6 is an exploded perspective view of the conventional turn signal switch device. FIG. 7 is a bottom view of the canceling mechanism. FIG. 8 is a view illustrating the operation of the canceling mechanism.

In drawings, the turn signal switch device comprises first and second cases 101 and 102 made of synthetic resin, which constitute a housing, an operating lever 103 rotatably supported to the cases 101 and 102, first and second levers 104 and 105 provided on the internal surface of the second case 102, and a torsion spring 106 that applies elastic force to a direction where the first lever 104 protrudes from the second case 102. To be mentioned later, the operating lever 103 includes an operating member 107, a holder 108, and a movable member 109. The first and second cases 101 and 102 are integrated with each other using means such as snap coupling and are fixed to a stator member such as a column cover and a combination switch (not shown).

A V-shaped cam surface 110 is formed inside the first case 101. A driving body 124 engaged with a holder 108 is provided in the cam surface 110 to slide by the force applied by a spring 125. A print substrate (not shown) and a contact point portion for turning on lamps for a left signal and right turn signal are provided on the bottom surface of the first case 101.

A guide shaft 116 and a spindle 117 are provided on the internal surface of the second case 102 to be erected on the same line. The first lever 104 and the second lever 105 are rotatably provided in the guide shaft 116 and the spindle 117, respectively. The first lever 104 and the second lever 105 are rotatably connected to each other. A boss 119 into which a torsion spring 106 is inserted is provided.

Elongated apertures 104a and 104b and a spring receiving portion 104c are provided in the first lever 104. The elongated aperture 104a rotates and slides along the guide shaft 116 and the guide shaft 116 is inserted into the elongated aperture 104a. An abutment portion 104d and a cam portion 104e protrude from the front and in the rear of the first lever 104, respectively.

A first opening 121 and a second opening 122 and a hole 105a rotatably and axially supported to the spindle 117 are provided in the second lever 105. A protrusion 105c and a connecting pin 105d are provided in the tip of the second lever 105. The connecting pin 105d is inserted into the elongated aperture 104d. The tip of the second lever 105 overlaps the first lever 104.

The torsion spring 106 has an arm 106c that extends in a cantilever shape. The arm 106c is engaged with the spring receiving portion 104c of the first lever 104. Elastic force is applied to the first lever 104 in the longitudinal direction of the elongated apertures 104a and 104b by the torsion spring 106.

The operating member 107 is fixed to the base of the operating lever 103, and holder 108 is snapped. A mountain-shaped cam surface 108c is provided in the tip of the top surface of the holder 108. The cam portion 104e of the first lever 104 faces the cam surface 108c. A pair of spindles 108d and 108e protrude from both top and bottom surfaces of the holder 108 and are fitted into the first and second cases 101 and 102.

The movable member 109 is inserted into an opening 108g of the holder 108, is forced by the spring 125, and is pivotally supported to the holder 108. A receiving portion 109e that reaches inside the second opening 122, protrudes from the top surface of the movable member 109. The receiving portion 109e slidably abuts on a curved portion 122a that protrudes from both edges of the opening 122 to the inside of the opening 122.

The first driving body 124 is slidably supported on the front end of the holder 108. The spring 125 is inserted between the first driving body 124 and the movable member 109. The tip of the first driving body 124 is pressed against the cam surface 110 of the first case 101 by the elastic repulsive force of the spring 125.

As mentioned above, the operating member 107 and the holder 108 are rotatably connected to and are fixed to the operating lever 103. The holder 108 and the cases 101 and 102 are rotatably connected to the spindles 108d and 108e, respectively.

The operation is described with reference to FIG. 8. When the operating lever 103 is in the neutral position, the first driving body 124 is maintained in the center of the cam surface 110. At this time, the cam portion 104e of the first lever 104 abuts on the apex of the cam surface 108c of the holder 108, such that, as illustrated in FIG. 8(A), the first lever 104 recedes against the force applied by the torsion spring 106 and is positioned outside the rotation orbit of a canceling protrusion 128.

Next, when the operating lever 103 rotates to a direction, the first driving body 124 slides on the cam surface 110 and is locked. At this time, the holder 108 and the movable member 109 rotate to a movement direction and the apex of the cam surface 108c deviates from the cam portion 104e. Thus, as illustrated in FIG. 8(B), the first lever 104 proceeds along the elongated apertures 104a and 104b by the force applied by the torsion spring 106 such that the abutment portion 104d enters the rotation orbit of the canceling protrusion 128.

In this state, when the handle is rotated in a reverse direction, the canceling protrusion 128 collides with the abutment portion 104d of the first lever 104 during a return operation, and the first lever 104 rotates in a clockwise direction around the guide shaft 117, such that the curved portion 122a of the second opening 122 presses the receiving portion 109e of the movable member 109 upward. The pressure is transmitted to the holder 108 through the movable member 109, such that the first driving body 124 deviates from a locking portion of the cam surface 110 and proceeds toward the center, and that the first and second levers 104 and 105 are automatically returned to the neutral position illustrated in FIG. 8(A).

On the other hand, in the state of FIG. 8(B), when a force that prevents the operating lever 103 from being automatically returned is applied, as illustrated in FIG. 8(C), the receiving portion 109e is pressed toward the curved portion 122a by the component force of the second lever 105 in a rotation direction, and the movable member 109 pivots against the elastic repulsive force of the spring 125, such that the first and second levers 104 and 105 can rotate without being disturbed by the receiving portion 109e.

[Patent Document 1]

Japanese Unexamined Patent Application Publication No. 2001-6495

However, according to the above-mentioned conventional turn signal switch device, a torsion spring is used as an elastic member for applying force to a lever toward the rotation orbit of a canceling protrusion. Thus, there is a first problem in that it is necessary to secure a large space for providing the torsion spring, such that it is difficult to miniaturize the turn signal switch device.

SUMMARY OF THE INVENTION

Accordingly, in order to solve the first problem mentioned above, it is a first object of the present invention to provide a turn signal switch device capable of being miniaturized and of improving the degree of freedom of a design.

According to the conventional turn signal switch device, a guide shaft 116 and a spindle 117 are erected in the internal surface of the second case 102. The first elongated aperture 104a of the first lever 104 is rotatably and slidably fitted on the guide shaft 116. In a state where a connecting pin 105d formed in the second lever 105 is inserted into a second elongated aperture 104b of the first lever 104, a hole 105a of the second lever 105 is rotatably fitted on the spindle 117, and elastic force is applied to the first lever 104 toward the rotation orbit of a canceling protrusion 128 by a torsion spring 106 inserted into a boss 119 of the second case 102, such that the first lever 104 can proceed to and recede from the rotation orbit of the canceling protrusion 128. On the other hand, an operating lever 103 in which a first case 101 includes an operating member 107, a holder 108, and a movable member 109, is constructed to be rotatable. Also, the operating lever 103 is constructed, in a neutral state, such that a cam portion 104e of the first lever 104 and a cam surface 108c formed in the holder 108 are engaged with each other in a predetermined position.

As mentioned above, since the cam portion 104e of the first lever 104 and the cam surface 108c formed in the holder 108 are engaged with each other in a predetermined position, when the operating lever 103 is in the neutral state, it is not possible to see a state in which the cam portion 104e and the cam surface 108c are engaged with each other during the turn signal switch device is assembled. Thus, it takes long to assemble the turn signal switch device, and it is necessary to examine the state in which the cam portion 104e and the cam surface 108c are engaged with each other after assembling the turn signal switch device.

Accordingly, in order to solve the above-mentioned second problem, it is a second object of the present invention to provide a turn signal switch device that does not need to examine the state in which the cam portion 104e and the cam surface 108c are engaged with each other after assembling the same.

In order to achieve the first object, according to a first aspect of the present invention, as first solving means, there is provided a turn signal switch device comprising a housing having a cam surface, an operating lever rotatably supported to the housing, a driving unit for maintaining the operating lever to be in a neutral position and an operating position in cooperation with the cam surface, a first lever rotating while abutting on a canceling protrusion of a handle, a first elastic member for elastically forcing the first lever toward the rotation orbit of a canceling protrusion, and a second lever for returning the operating lever from the operating position to the neutral position by interlocking with the rotation of the first lever. The first lever recedes outside the rotation orbit of the canceling protrusion against the elastic force of the first elastic member by the operating lever, when the operating lever is in the neutral position, and the first lever enters the rotation orbit of the canceling protrusion by the force applied by the first elastic member, when the operating lever is in the operating position. The first and second shafts are formed in the housing. The first lever is provided in the first shaft to be rotatable and to proceed to and recede from the rotation orbit of the canceling protrusion. The second lever is rotatably provided in the second shaft. The first lever and the second lever are rotatably connected to each other. The second elastic member is provided in the housing together with the first elastic member. When the operating lever is in the neutral position, the first lever is maintained in the rotation neutral position by the first elastic member, and the second lever is maintained in the rotation neutral position by the second elastic member.

According to such a structure, the first and second elastic members that maintain the first lever and the second lever to be in the rotation neutral position are provided in parallel such that it is possible to simplify the structure and to facilitate assembling. Also, since it is possible to significantly reduce the space in which the first elastic member that applies force to the first lever is provided, it is possible to miniaturize the turn signal switch device. Furthermore, since the first and second levers are maintained in the rotation neutral position by the force applied by the first and second elastic members, it is possible to divide the stress applied to one spring and to prolong the expected life span of the turn signal switch device.

As second solving means, a connecting unit between the first lever and the second lever is positioned to be closer to the rotation orbit of the canceling protrusion than the first and second shafts.

According to such a structure, it is possible to surely rotate the second operating lever in accordance with the rotation of the first operating lever.

As third solving means, the first elastic member and the second elastic member are made of a thin plate-shaped plate spring having a plat portion and are arranged to be parallel to the housing.

According to such a structure, it is possible to simplify the structure of the turn signal switch device and to reduce manufacturing cost. Also, since the elastic members are made of the thin plate-shaped plate spring, it is possible to set the stress on each plate spring to be large. Also, since the plate spring is simply curved, it is possible to prolong the expected life span of the turn signal switch device.

As fourth solving means, a first flat portion is formed in one end of the first lever, and a flat plate portion of the first elastic member abuts on the first flat portion. A second flat portion is formed in one end of the second lever, and a flat plate portion of the second elastic member abuts on the second flat portion, such that the first lever and the second lever can be maintained in the rotation neutral position.

According to such a structure, since it is possible to maintain the first and second levers at the respective flat portions, it is possible to surely maintain the first and second levers to be in the rotation neutral position.

In order to solve the second object, according to the second aspect of the present invention, as first solving means, there is provided a turn signal switch device comprising a housing having a cam surface, an operating lever rotatably supported to the housing, a driving unit for maintaining the operating lever to be in a neutral position and an operating position in cooperation with the cam surface, a first lever rotating while abutting on a canceling protrusion of a handle, an elastic member for elastically forcing the first lever toward the rotation orbit of a canceling protrusion, and a second lever for returning the operating lever from the operating position to the neutral position by interlocking with the rotation of the first lever. The first lever recedes outside the rotation orbit of the canceling protrusion against the elastic force of the elastic member by the operating lever, when the operating lever is in the neutral position, and the first lever enters the rotation orbit of the canceling protrusion by the force applied by the first elastic member, when the operating lever is in the operating position, an intermediate support member is provided in the housing of the turn signal switch device. The opening, and the first and second shafts are formed in the intermediate support member. In a state where the cam portion protruding from the first lever passes through and is inserted into the opening on one surface of the intermediate support member, the first lever is axially supported to the first shaft to rotate and slide, and the connecting pin protruding from the second lever is connected to the first lever, such that the first lever can rotate and slide with respect to the connecting pin. The second lever is rotatably and axially supported to the second shaft. The holder having the cam portion driven by the operating lever is arranged on the other surface of the intermediate support member. The cam portion of the holder is engaged with the cam portion of the first lever that passes through and is inserted into the opening.

According to such a structure, since an operator can overlap the intermediate support member on the holder, in a state where the opening of the intermediate support member corresponds to the cam portion of the movable member arranged on the bottom surface of the holder driven by the operating lever and can attach the first lever to the second lever while engaging the cam portion of the movable member with the cam portion of the first lever in a predetermined position, in a state where the operator can see what is going on, it is possible to easily and surely perform assembling, and it is not necessary to confirm whether the first lever and the second lever are surely attached to each other after assembling.

As second solving means, the housing comprises a first case and a second case having openings on the surfaces facing each other. The intermediate support member is interposed between the first case and the second case. The operating lever and the holder are arranged in the first case. The first lever and the second lever are arranged in the second case with the intermediate support member interposed between the first case and the second case.

According to such a structure, the operating lever, the movable member, the intermediate support member, the first lever, and the second lever are provided in the first case in the order and then, the first case is attached to the second case. Thus, it is possible to automatically perform the assembling and to improve work efficiency.

As third solving means, the elastic member is made of a thin plate-shaped plate spring having a flat plate portion. The plate spring is arranged on one surface to which the first lever of the intermediate support member is axially supported.

According to such a structure, it is possible to facilitate assembling compared with the conventional technology in which the torsion spring is used, and to improve the work efficiency of the assembling.

DESCRIPTION OF THE PREFERRED EMBODIMENTS

Figure 1:
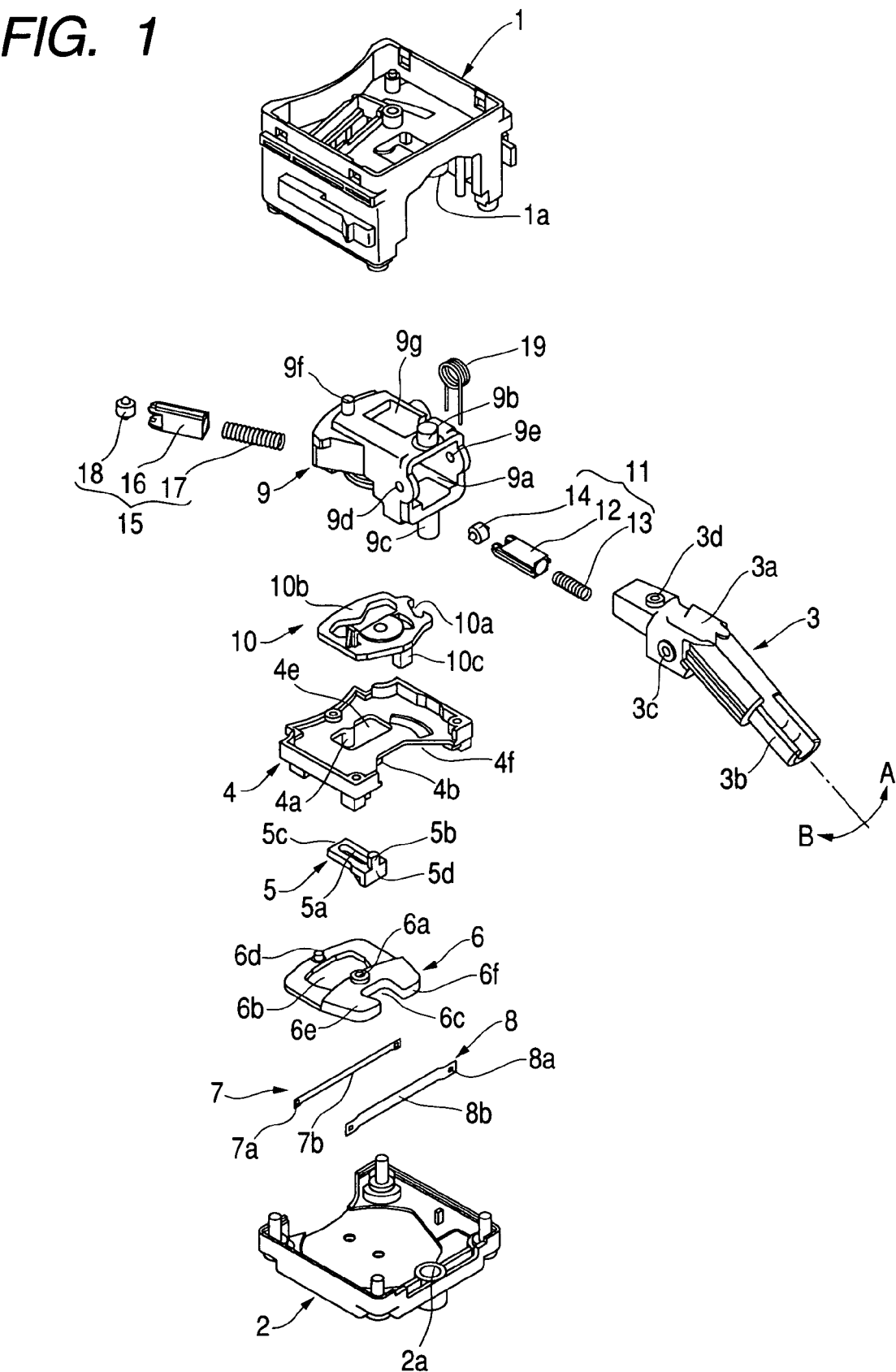
FIG. 1 is an exploded perspective view illustrating a turn signal switch device according to a first embodiment of the present invention.
Figure 2:
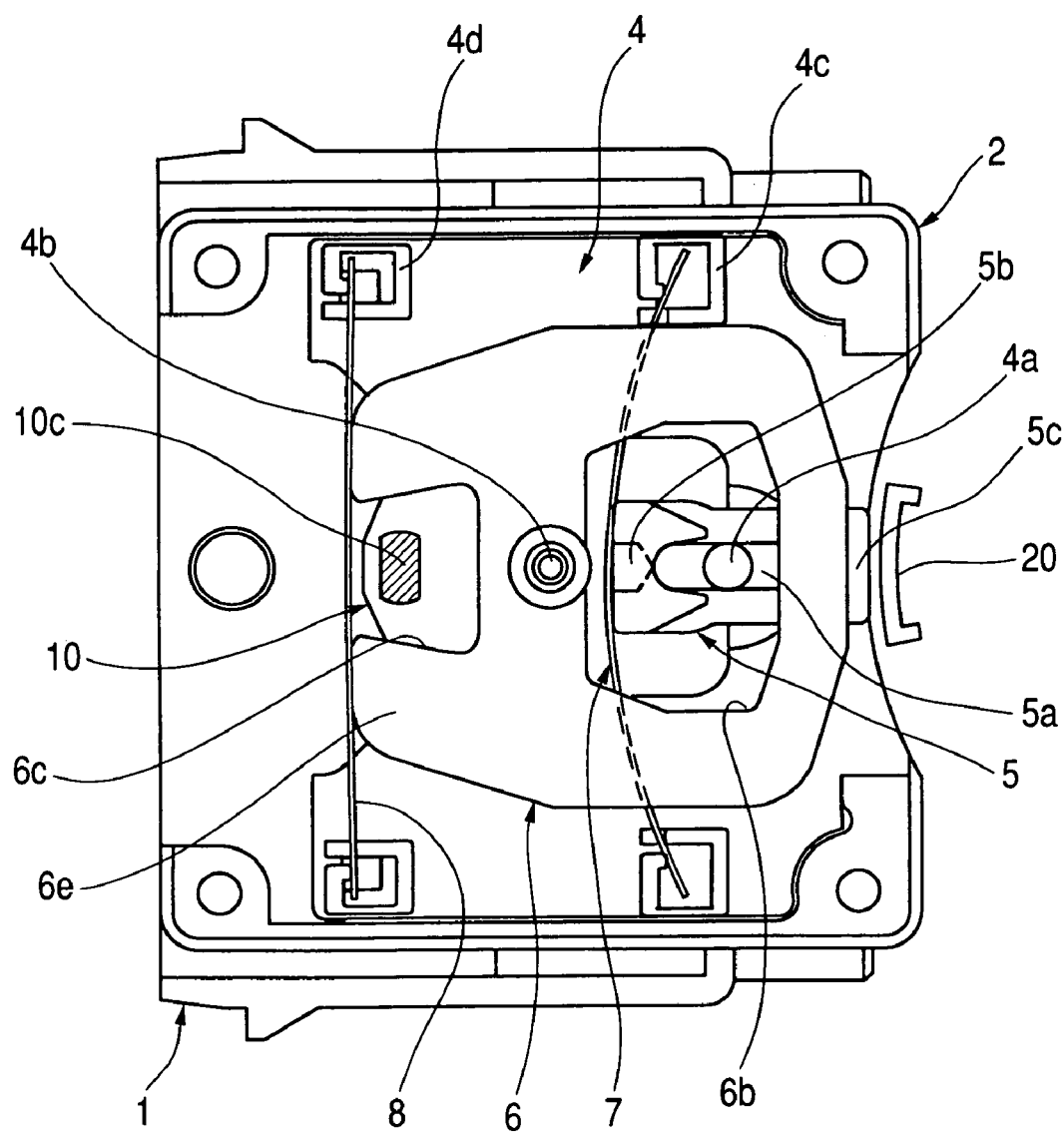
FIG. 2 is a view illustrating a state in which an operating lever is in a neutral position in a canceling mechanism of the turn signal switch device according to the first embodiment of the present invention.
Figure 3:
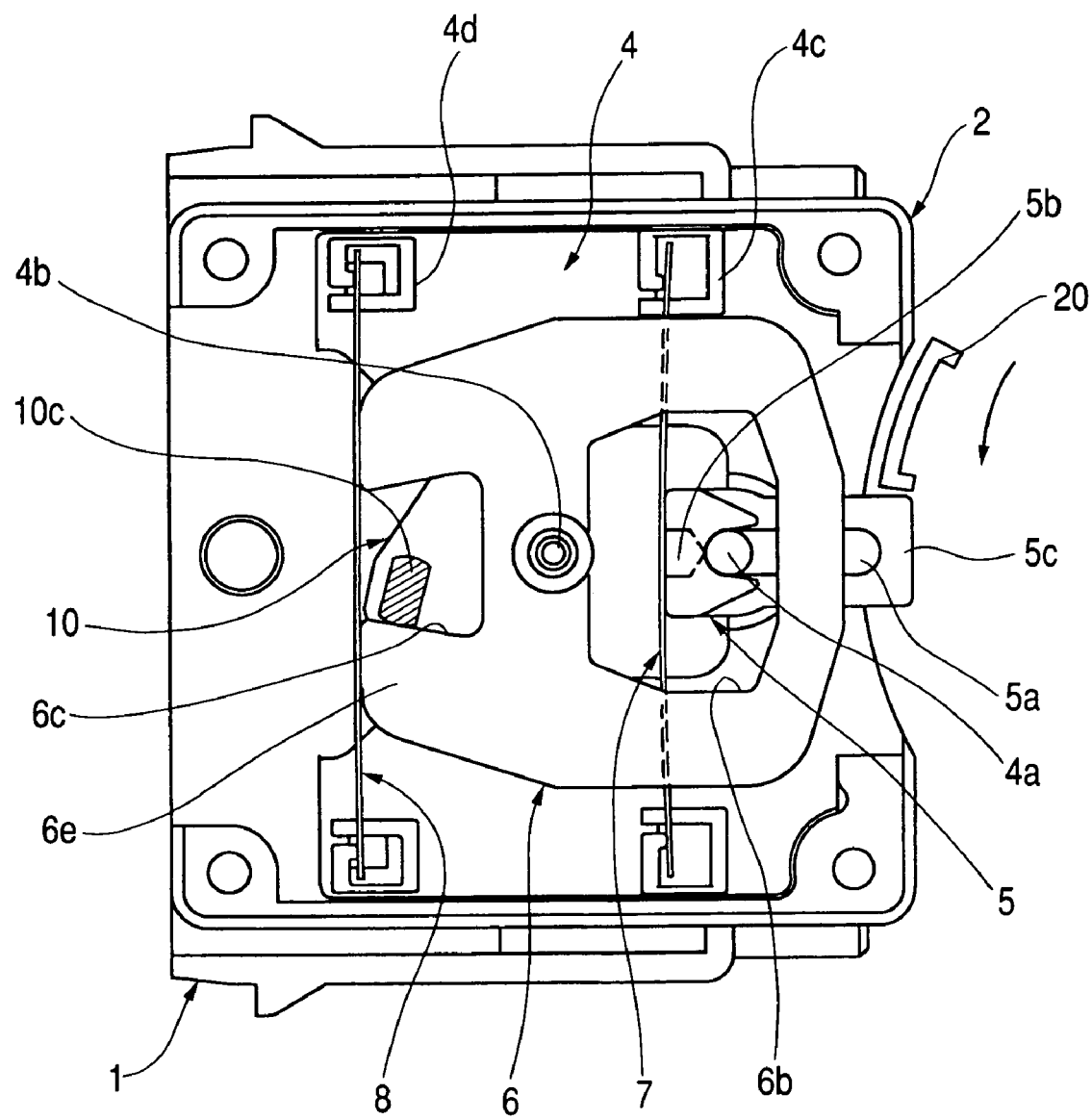
FIG. 3 is a view illustrating a canceling standby state of the canceling mechanism of the turn signal switch device according to the first embodiment of the present invention.
Figure 4:
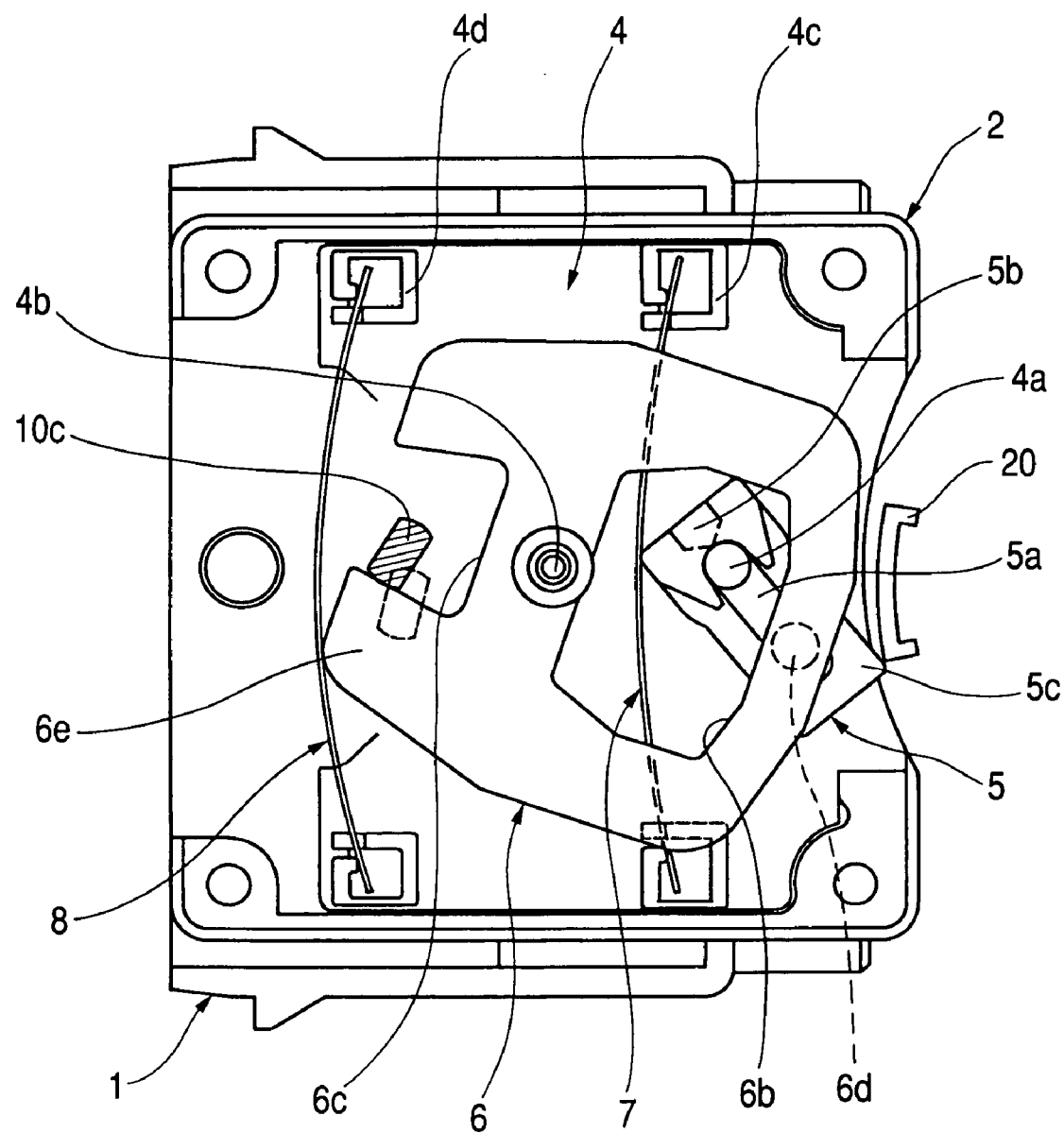
FIG. 4 is a view illustrating a state in which a handle is rotated in a reverse direction with the operating lever pressed in the canceling standby state of the canceling mechanism according to the first embodiment of the present invention.

A turn signal switch device according to an embodiment of a first aspect of the present invention is now described with reference to FIGS. 1 to 4. FIG. 1 is an exploded perspective view illustrating a turn signal switch device according to a first embodiment of the present invention. FIG. 2 is a view illustrating a state in which an operating lever is in a neutral position in a canceling mechanism of the turn signal switch. FIG. 3 is a view illustrating a canceling standby state of the canceling mechanism of the turn signal switch device according to the first embodiment of the present invention. FIG. 4 is a view illustrating a state in which a handle is rotated in a reverse direction with the operating lever pressed in the canceling standby state of the canceling mechanism.

Also, FIGS. 2 to 4 illustrate the canceling mechanism seen through from the bottom of the second case.

The turn signal switch device according to the present embodiment includes first and second cases 1 and 2 made of synthetic resin, which constitute a housing, an operating lever 3 rotatably supported to the cases 1 and 2, an intermediate support member 4 arranged between the cases 1 and 2, first and second levers 5 and 6 provided on the internal surface of the intermediate support member 4, a first elastic member 7 that applies elastic force to the first lever 5 to a direction where the first lever 5 protrudes from the second case 2, and a second elastic member 8 that applies elastic force to the second lever 6 such that the second lever member 6 is maintained in the neutral position. To be mentioned later, the operating lever 3 includes a holder 9 and a movable member 10. The first and second cases 1 and 2 are integrated with each other using means such as snap coupling and are fixed to a stator member such as a column cover and a combination switch (not shown).

A V-shaped cam surface (not shown) is formed inside the first case 1. The cam has a valley in the center thereof and a pair of locking portions positioned on both sides thereof. A second operating member 15 of the operating lever 3, to be mentioned later, slidably abuts on the cam surface, such that the operating lever 3 is locked to the neutral position and the operating position. A switch (not shown) formed in the first case 1, is driven by the rotation of the operating lever 3 to turn on and off a lamp while turning right and left.

Axial bores 1a and 2a are provided in the internal surfaces of the first and second cases 1 and 2, which face each other, respectively. The holder 9, to be mentioned later, is rotatably and axially supported to the axial bores 1a and 2a.

The intermediate support member 4 that is made of synthetic resin and that is almost rectangular, is arranged between the first and second cases 1 and 2. In the center of the intermediate support member 4, circular column-shaped first and second shafts 4a and 4b are erected on the same line to be separated from each other by a predetermined distance. Two pairs of spring receiving portions 4c and 4d that face each other, are provided at the four corners of the rectangular intermediate support member 4. The first and second elastic members 7 and 8 made of a thin plate-shaped metal spring are provided in parallel in the spring receiving portions 4c and 4d.

The first lever 5 that is made of synthetic resin and that is almost rectangular has an elongated aperture 5a in the center thereof. The first shaft 4a of the intermediate support member 4 is inserted into the elongated aperture 5a, and the first lever 5 rotates and slides along the first shaft 4a. A cam portion 5b is erected in one end of the first lever 5. The tip of the cam portion 5b is mountain-shaped. An abutment portion 5c that abuts on a canceling protrusion 20 of the handle, protrudes from the other end that faces the cam portion 5b. One end in which the cam portion 5b is provided, is a planar flat portion 5d. A flat plate portion of the first elastic member 7 abuts on the flat portion 5d.

The second lever 6 that is made of synthetic resin and that is a flat plate, has an axial bore 6a in the center thereof. The second shaft 4b of the intermediate support member 4 is inserted into the axial bore 6a and the second lever 6 rotates along the second shaft 4b. An opening 6b and a notch 6c are provided, with the axial bore 6a interposed. A connecting pin 6d protrudes from one end of the opening 6b. A pair of operating arms 6e are provided on both sides of the notch 6c. The tips of the operating members 6e are planar flat portions 6f that are the same plane as the operating members 6e. A flat plate portion of the second elastic member 8 abuts on the flat portions 6f.

The second lever 6 overlaps the first lever 5 on the internal surface of the intermediate support member 4. The first lever 5 and the second lever 6 are rotatably and slidably connected to each other by the elongated aperture 5a and the connecting pin 6d.

In this case, since the connecting unit for connecting the first lever 5 to the second lever 6, is formed to be closer to the rotation orbit of the canceling protrusion 20 than to the first and second shafts 4a and 4b, it is possible to surely rotate the second operating lever 6 in accordance with the rotation of the first operating lever 5. Thus, it is possible to stabilize the operation of the canceling mechanism.

A flat portion 5d of the first lever 5 protrudes from the opening 6b of the second lever 6 to the second case 2. Elastic force is applied to the first lever 5 by the first elastic member 7 to the longitudinal direction of the elongated aperture 5a. The first elastic member 7 is made of a thin plate-shaped metal spring and includes locking portions 7a on both ends inserted into the spring receiving portions 4c of the intermediate support member 4, and a flat plate portion 7b in the center thereof. The center of the flat plate portion 7b abuts on the flat portion 5d of the first lever 5. The cam portion 5b of the first lever 5 protrudes toward the first case 1 through the opening 4e provided in the internal surface of the intermediate support member 4. The cam portion 5b slidably abuts on a cam portion 10b of the movable member 10, to be mentioned later, such that the first lever 5 slides in the longitudinal direction of the elongated aperture 5a.

Elastic force is applied to the second lever 6 in the neutral position by the second elastic member 8. The second elastic member 8 is made of a thin plate-shaped metal spring and includes locking portions 8a on both ends inserted into the spring receiving portions 4d of the intermediate support member 4 and a flat plate portion 8b in the center thereof. The center of the flat plate portion 8b abuts on the flat portions 6f of the second lever.

As mentioned above, the first flat portion 5d is formed in one end of the first lever 5, and the flat plate portion 7b of the first elastic member 7 abuts on the first flat portion 5d, and second flat portions 6f are formed in one end of the second lever 6, and the flat plate portion 8b of the second elastic member 8 abuts on the second flat portion 6f, such that the first lever 5 and the second lever 6 are maintained in the neutral position of rotation. Thus, the first and second levers 5 and 6 can be maintained in the flat portions 5d and 6f, respectively, such that the first and second levers 5 and 6 can be surely maintained in the neutral position of rotation.

The canceling mechanism of the turn signal switch device is composed of the intermediate support member 4 arranged between the above-mentioned first and second cases 1 and 2, the first and second levers 5 and 6, and the first and second elastic members 7 and 8.

The operating lever 3 includes the holder 9 and the movable member 10, first and second operating members 11 and 15, and a torsion spring 19.

The operating lever 3 made of synthetic resin includes a base portion 3a and a lever portion 3b. A first operating member 11 is maintained in the rear end of the base portion 3a. Spindles 3c are provided on both sides of the base portion 3a and are axially supported to the holder 9, such that the base portion 3a rotates in a vertical (backward and forward) direction. A driving protrusion hole 3d into which a driving protrusion (not shown) is inserted, is provided in the top surface of the base portion 3a. The driving protrusion is connected to a switch (not shown) provided in the first case.

The first operating member 11 includes a driving body 12 made of synthetic resin, a coil spring 13 that applies force to the driving body 12, and a rotating member 14 attached to the tip of the driving body 12. The first operation member 11 slides on the cam surface of the holder 9 (not shown) in accordance with the rotation of the operating lever 3. The operating lever 3 rotates in a vertical direction (backward and forward) direction such that the rotating member 14 slides on the cam surface. Thus, the switch performs switching, and switching or passing of a beam is appropriately performed.

The holder 9 made of synthetic resin has an opening 9a engaged with the base portion 3a of the operating lever 3 in the front surface. A cam portion (not shown) on which the rotating member 14 of the first operating member 11 slides, is provided on the internal surface of the opening 9a. Spindles 9b and 9c are provided on the top and bottom ends of the opening 9a, are axially supported to the axial bores 1a and 2a of the first and second cases 1 and 2, and are rotatably attached. Axial bores 9d and 9e to which the spindle 3c of the operating lever 3 is axially supported, are provided on both sides of the opening 9a. The second operating member 15 is maintained in the rear end of the holder 9. A driving protrusion 9f is provided on the top surface in the rear end and is connected to the switch (not shown) arranged in the first case 1. An aperture 9g through which a driving protrusion 9f protrudes from the base portion of the operating lever 3 is provided on the top surface of the holder 9.

The second operating member 15 includes a driving body 16 made of synthetic resin, a coil spring 17 that applied force to the driving body 16, and a rotating member 18 attached to the tip of the driving body 16. The second operating member 15 slides on the cam surface of the first case 1 (not shown) in accordance with the rotation of the operating lever 3 in a horizontal (right and left) direction. The operating lever 3 rotates in the horizontal (right and left) direction, such that the rotating member 18 slides on the cam surface. Thus, the switch performs switching, and appropriately turns on and off while turning right and left.

The movable member 10 made of synthetic resin is arranged on the bottom surface of the holder 9. A spring supporting portion 10a is provided in one end of the movable member 10. One end of the torsion spring 19 is inserted into the spring insert portion 10a and the other end of the torsion spring 19 is inserted into to the holder 9. That is, the holder is attached to the movable member 10 via the torsion spring 19 to slightly rotate.

A mountain-shaped cam portion 10b is provided in one end of the movable member 10. The cam portion 5b of the first lever 5 slidably abuts on the cam portion 10b through the opening 4e formed in the internal surface of the intermediate support member 4. At this time, the first lever 5 slides on the cam portion 10b of the movable member 10, such that the first lever 5 slides in the longitudinal direction of the elongated aperture 5a.

A protruded column-shaped receiving portion 10c that protrudes toward the intermediate support member 4, is provided in the other end of the cam portion 10b of the movable member 10. The receiving portion 10c extends to the inside of the notch 6c of the second lever 6 via the notch 4f of the intermediate supporting portion 4. The receiving portion 10c remains to abut on the operating arms 6e of the second lever 6, when the operating lever 3 rotates in the horizontal (right and left) direction to be locked to the operating position.

Next, the operation of the turn signal switch device having the above-mentioned structure will be described with reference to FIGS. 2 to 4.

First, as illustrated in FIG. 2, when the operating lever 3 is in the neutral position, the tip of the second operating member 15 abuts on the valley in the center of the cam surface (not shown) of the case 1, and is maintained in the corresponding position. At this time, the cam portion 5b of the first lever 5 abuts on the apex of the mountain-shaped cam portion 10b of the movable member 10. As illustrated in FIG. 2, the first lever 5 recedes against the force applied by the first elastic member 7.

Thus, the abutment portion 5c of the first lever 5 is positioned outside the rotation orbit of the canceling protrusion that rotates by interlocking with the handle. Even if the handle is rotated in this state, the canceling protrusion 20 does not abut on the abutment portion 5c of the first lever 5 and the operating lever 3 is maintained in the neutral position.

When the operating lever 3 rotates to a direction of the horizontal (right and left) direction from the neutral position, the tip of the second operating member 15 slides on the cam surface of the case 1 (not shown) and is locked between the locking portions provided on both sides, such that a clicking sense occurs when the tip of the second operating member 15 goes over the inclined surface of the cam surface.

For example, when the operating lever 3 rotates in the direction marked with the arrow B of FIG. 1, the holder 9 and the movable member 10 rotate in the same direction by interlocking with the operating lever 3, in accordance with which, the apex of the cam portion 10b deviates from the cam portion 5b. Thus, as illustrated in FIG. 3, the first lever 5 receives the elastic force of the first elastic member 7 and proceeds to the longitudinal direction of the elongated aperture 5a and the abutment portion 5c enters the rotation orbit of the canceling protrusion 20.

At this time, in accordance with the rotation of the operating lever 3 to the direction marked with the arrow B, the receiving portion 10c of the movable member 10 maintained in the stable position of the holder 9 is displaced in the notch 6c of the second lever 6 and, as illustrated in FIG. 3, abuts on one operating arm 6e of the notch 6c. Furthermore, since the driving protrusion 9f of the holder 9 drives the switch (not shown) arranged in the first case 1 in accordance with the rotation of the operating lever 3 to the direction marked with the arrow B, a contact point is switched and a right turn signal lamp (not shown) is turned on and off.

In a state where the operating lever 3 rotates to the right as illustrated in FIG. 3, when the handle is rotated in a reverse direction (in the direction marked with the arrow in FIG. 3), the canceling protrusion 20 collides with the abutment portion 5c of the first lever 5 during the returning operation. As a result, the first lever 5 rotates in the clockwise direction of FIG. 3 around the first shaft 4a, in accordance with which, the second lever 6 connected to the first lever 5 rotates in the clockwise direction around the second shaft 4b. Thus, the operating arms 6e of the second lever 6 are rotated and displaced upward in FIG. 3.

Thus, the operating arms 6e press the receiving portion 10c of the movable member 10 upward, and the pressing force is transmitted to the holder 9. through the movable member 10, such that the tip of the second operating member 15 maintained in the holder 9 is deviated from the locking portions of the cam surface (not shown) of the first case 1, and proceed to the valley in the center, and that the operating lever 3 and the first and second levers 5 and 6 are automatically returned to the neutral position illustrated in FIG. 2.

As mentioned above, the pair of operating arms 6e are provided in the second lever 6 that faces the first lever 5. The operating arms 6e abut on the receiving portion 10c that protrudes from the movable member 10 by interlocking with the rotation of the first lever 5, and rotate the holder 9 through the movable member 10 to return the operating lever 3 from the operating position to the neutral position. Thus, it is not necessary to provide the cam surface, such that it is possible to simplify the structure, and to surely return the operating lever 3 to the neutral position.

In the case where certain force that prevents the operating lever 3 from being automatically returned, is applied in the state where the operating lever 3 rotates to the right, as illustrated in FIG. 3, for example, when the handle is rotated to the reverse direction while pressing the operating lever 3, as mentioned above, the second lever 6 tries to rotate in the clockwise direction around the second shaft 4b. However, since the operating lever 3 is pressed, the holder 9 does not rotate, such that overload is generated in the portion where the operating arms 6e abut on the receiving portion 10c of the movable member 10.

When the overload is generated, as illustrated in FIG. 4, the receiving portion 10c is pressed toward the operating arms 6e by the component force of the second lever 6 in the rotating direction, and the movable member 10 slightly rotates against the repulsive force of the torsion spring 19, such that the receiving portion 10c moves from the stable position marked with the dotted line of FIG. 4 to the retracted position marked with the solid line (the section). Thus, the first and second levers 5 and 6 can rotate without being disturbed by the receiving portion 10c.

When the canceling protrusion 20 passes through the abutment portion 5c of the first lever 5, the movable member 10 is automatically returned from the retracted position to the stable position by the repulsive force of the torsion spring 19, such that the operating lever 3 remains rotated to the right as illustrated in FIG. 3.

As mentioned above, the overload generated in the portion where the operating arms 6e of the second lever 6 abut on the receiving portion 10c of the movable member 10 during the canceling operation, is released (absorbed) by the movement of the movable member 10, such that it is possible to prevent power transmission parts such as the levers 5 and 6 and the movable member 10 from being damaged.

On the other hand, when the operating lever 3 rotates in the direction orthogonal to the indicating position (orthogonal to the arrows A and B of FIG. 1), as mentioned above, the operating lever 3 and the first operating member 11 rotate by a predetermined angle in a perpendicular direction with respect to the housing (the cases 1 and 2) and the holder 9 using the straight line that connects the spindles 3c as a rotation shaft, in accordance with which, the tip of the first operating member 11 slides on the cam surface (not shown) on the internal surface of the opening 9a of the holder 9 to generate a clicking sense. At this time, in accordance with the rotation of the operating lever 3, the driving protrusion 9f inserted into the driving protrusion hole 3d, drives the switch (not shown) arranged in the first case 1, such that the contact point is switched and switching or passing of a beam is performed.

According to the first embodiment of the present invention, in the structure of the turn signal switch device, the first lever 5 recedes outside the rotation orbit of the canceling protrusion 20 against the elastic force of the first elastic member 7 by the operating lever 3, when the operating lever 3 is in the neutral position. The first lever 5 enters the rotation orbit of the canceling protrusion 20 by the force applied by the first elastic member 7, when the operating lever 3 is in the operating position. The first and second shafts 4a and 4b are formed in the housing (the intermediate support member 4). The first lever 5 is provided in the first shaft 4a to be rotatable, and to proceed to and recede from the rotation orbit of the canceling protrusion 20. The second lever 6 is rotatably provided in the second shaft 4b. The first lever 5 and the second lever 6 are rotatably connected to each other. Furthermore, the second elastic member 8 is provided in the housing (the intermediate support member 4) together with the first elastic member 7. When the operating lever 3 is in the neutral position, the first lever 5 is maintained in the rotation neutral position by the first elastic member 7, and the second lever 6 is maintained in the rotation neutral position by the second elastic member 8. Thus, the first and second elastic members 7 and 8 that maintain the first and second levers 5 and 6 to be in the rotation neutral position, are provided in parallel, such that it is possible to simplify the structure and to facilitate assembling. It is possible to significantly reduce a space for the first elastic member 7 that applies force to the first lever 5 compared with the conventional technology, such that it is possible to miniaturize the device.

The first and second levers 5 and 6 are maintained in the rotation neutral position by the force applied by the first and second elastic members 7 and 8, such that it is possible to disperse the stress of the spring applied to one of the first and second levers 5 and 6 and to prolong the life of the turn signal switch device.

The first and second elastic members 7 and 8 made of a thin plate-shaped plate spring have flat plate portions 7b and 8b and are arranged to be parallel to the housing (to the intermediate support member 4), such that it is possible to simplify the structure and to facilitate assembling and to reduce the manufacturing cost. Since the elastic members are made of the flat plate-shaped plate spring, it is possible to increase the stress of the plate springs, such that the elastic members are simply curved during the operation of the levers 5 and 6. Thus, it is possible to prolong the expected life span of the turn signal switch device.

Figure 5:
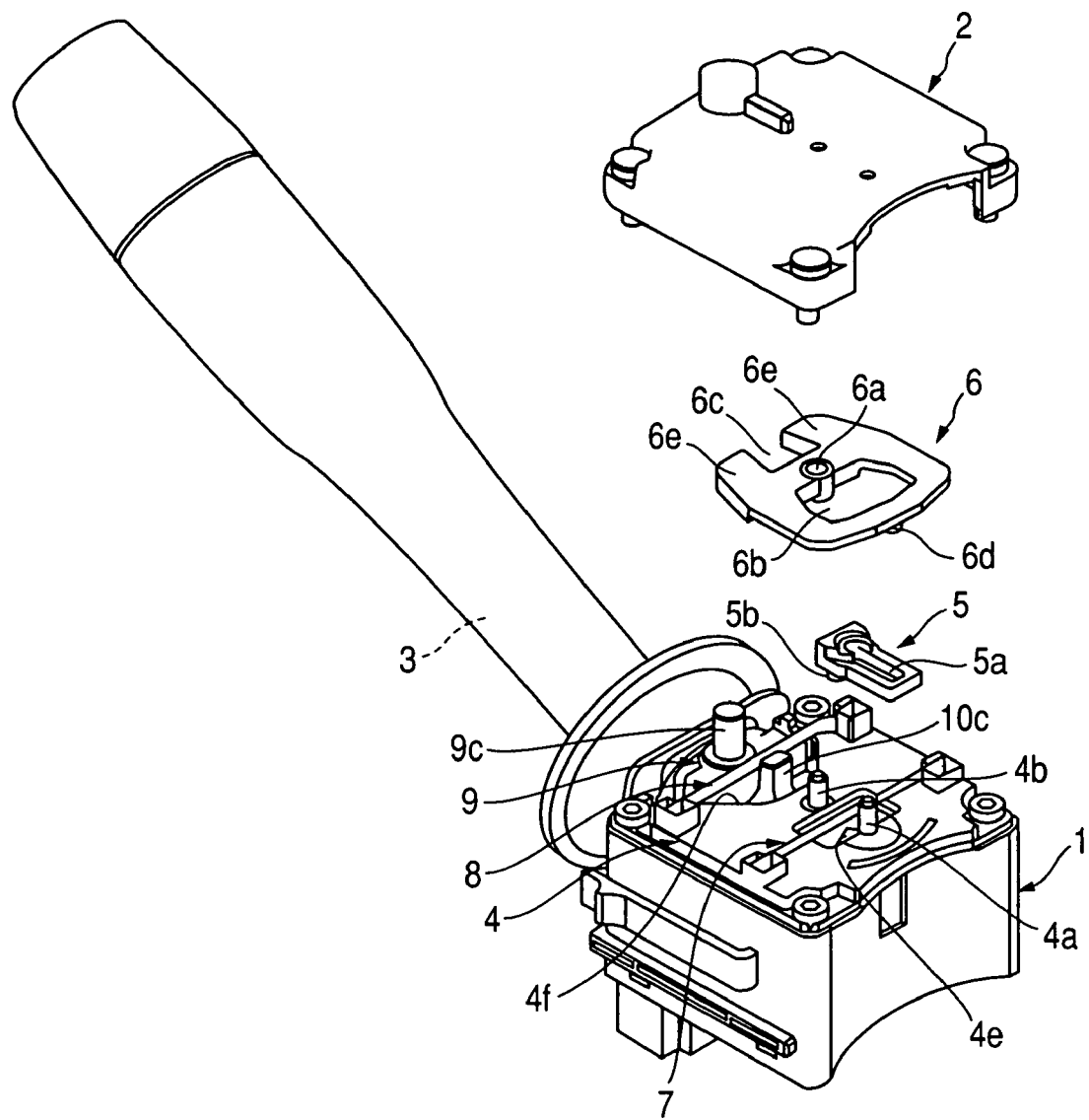
FIG. 5 is a perspective view illustrating a state in which a second case of a turn signal switch device according to a second embodiment of the present invention is separated from first and second levers.
Figure 6:
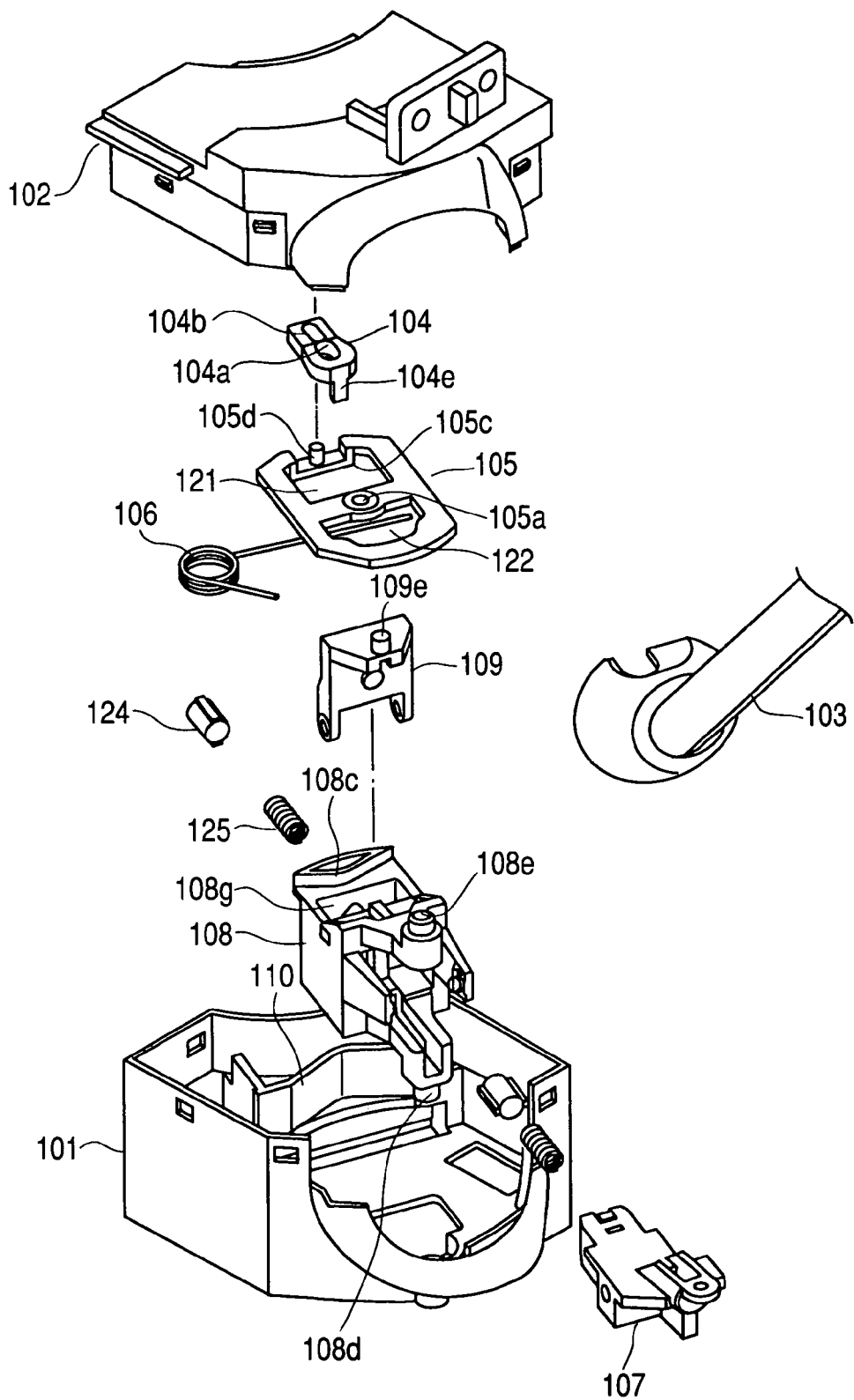
FIG. 6 is an exploded perspective view illustrating a conventional turn signal switch device.
Figure 7:
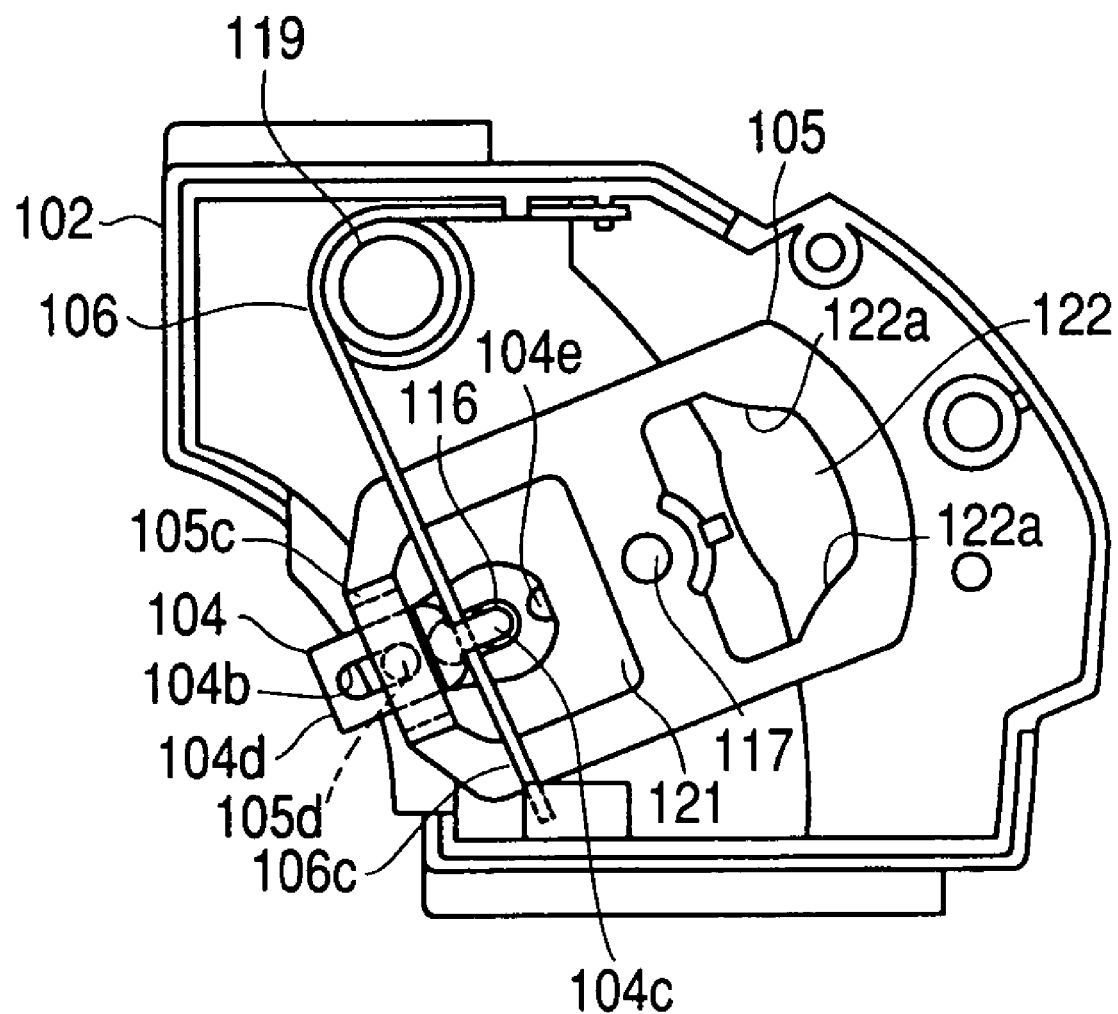
FIG. 7 is a bottom view illustrating a conventional canceling mechanism.
Figure 8A:
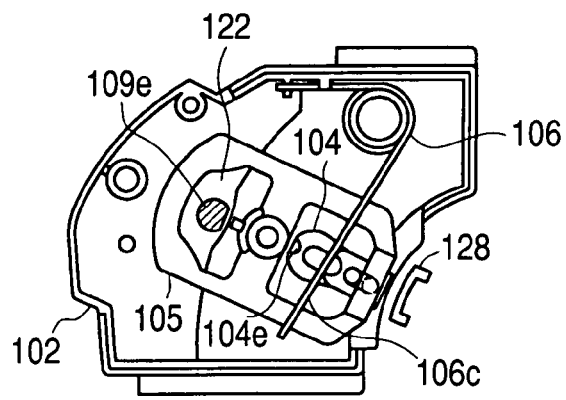
FIGS. 8A, 8B and 8C are views illustrating the operation of the conventional canceling mechanism.
Figure 8B:
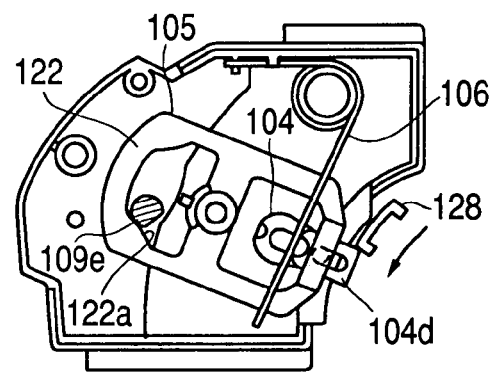
Figure 8C:
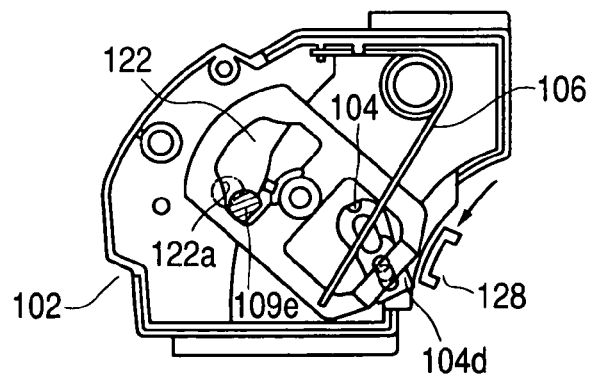

Next, a turn signal switch device according to an embodiment of the second aspect of the present invention is illustrated with reference to FIGS. 2 and 5. FIG. 5 is a perspective view of the turn signal switch device according to the second aspect of the present invention.

When the turn signal switch device of the present invention is assembled, as illustrated in FIGS. 2 and 5, after attaching the operating lever 3 with which the first operating member 11 is engaged and the movable member 10 to which force is applied by the second operating member and the torsion spring 19, to the holder 9, the holder 9 is attached to the axial bore 1a in the opening of the first case 1 such that the spindle 9b is rotatable and that the movable member 10 is positioned in the upper portion.

Next, the intermediate support member 4 in which the first and second elastic members 7 and 8 are arranged, is attached onto the opening of the first case 1 to which the holder 9 is attached. At this time, as illustrated in FIG. 2, the cam portion 10b of the movable member 10 is arranged in the opening 4e of the intermediate support member 4 to face the opening 4e of the intermediate support member 4. The receiving portion 10c that protrudes from the movable member 10 is arranged in the notch 4f to pass through the notch 4f.

Next, the elongated aperture 5a of the first lever 5 is axially supported to the first shaft 4a of the intermediate support member 4 to rotate and slide. The cam portion 5b that protrudes from one surface (downward in the drawing) is engaged with the cam portion 10b of the movable member 10 arranged thereunder, through the opening 4e of the intermediate support member 4. At this time, the flat portion 5d of the first lever 5 abuts on the first elastic member 7, such that the elastic force is applied to the longitudinal direction of the elongated aperture 5a. However, since the tip of the cam portion 5b of the first lever 5 is controlled while abutting on the tip of the cam portion 10b of the movable member 10, the flat portion 5d of the first lever 5 is maintained in the position in a state where the elastic force is applied to the first elastic member 7.

Next, the connecting pin 6d that protrudes from the second lever 6 is engaged with the elongated aperture 5a of the first lever 5, such that the axial bore 6a of the second lever 6 is rotatably and axially supported to the second shaft 4b of the intermediate support member 4. The receiving portion 10c that protrudes from the movable member 10 passes through the notch 6c, such that the receiving portion 10c is arranged between the pair of operating arms 6e. At this time, the flat portion 6f of the second lever 6 abuts on the second elastic member 8, such that the elastic force is applied to the neutral position.

Finally, the opening of the second case 2 is placed downward, such that the first and second levers 5 and 6 are accommodated in the opening, and that the axial bore 2a of the second case 2 is rotatably and axially supported to the spindle 9c of the holder 9. The second case 2 is attached to the first case 1 so that the intermediate support member 4 is interposed between the first case 1 and the second case 2 with the intermediate support member 4 placed on the second case 2 to thus complete assembling.

As mentioned above, in the turn signal switch device having the above-mentioned structure, the housing is composed of the first case 1 and the second case 2 having the openings on surfaces that face each other, respectively. The intermediate support member 4 is interposed between the first case 1 and the second case 2. The operating lever 3 and the holder 9 to which the movable member 10 is attached, are arranged in the first case 1, and the first lever 5 and the second lever 6 are arranged in the second case 2 with the intermediate support member 4 interposed between the first case 1 and the second case 2. The assembling is performed by providing the operating lever 3, the holder 9 to which the movable member 10 is attached, the intermediate support member 4, the first lever 5, and the second lever 6 in the first case 1, in the order, and by attaching the second case 2 to the first case 1. Thus, it is possible to automatically perform the assembling and to improve work efficiency.

The first and second elastic members 7 and 8 for applying the elastic force to the first and second levers 5 and 6 are made of the thin plate-shaped plate spring, such that the thin plate-shaped plate spring is arranged on one surface of the intermediate support member 4 to which the first and second levers 5 and 6 are axially supported. Thus, the assembling is simpler and easier than in the conventional turn signal switch device using the torsion spring to improve the work efficiency.

According to the embodiment of the second aspect of the present invention, the intermediate support member 4 is provided in the housing of the turn signal switch device, and the opening 4e and the first and second shafts 4a and 4b are formed in the intermediate support member 4. In a state where the cam portion 5b that protrudes from the first lever 5 passes through and is inserted into the opening 4e on one surface of the intermediate support member 4, the first lever 5 is axially supported to the first shaft 4a to rotate and slide, and the connecting pin 6d that protrudes from the second lever 6 is connected to the first lever 5, such that the first lever 5 can rotate and slide with respect to the connecting pin 6d. The second lever 6 is rotatably and axially supported to the second shaft 4b, and the holder 9 having the cam portion 10b driven by the operating lever 3 is arranged on the other surface of the intermediate support member 4, such that the cam portion 10b of the holder 9 is engaged with the cam portion 5b of the first lever 5 that passes through and is inserted into the opening 4e. In the state where the opening 4e of the intermediate support member 4 corresponds to the cam portion 10b of the movable member 10 arranged on the bottom surface of the holder 9 driven by the operating lever 3, the operator can provide the intermediate support member 4 on the holder 9, and can attach the first lever 5 to the second lever 6 while engaging the cam portion 10b of the movable member 10 with the cam portion 5b of the first lever 5 in a predetermined position, in a state where the operator can see what is going on. Thus, it is possible to easily and surely perform assembling and it is not necessary to confirm whether the first lever 5 is attached to the second lever 6 after the assembling.

As mentioned above, the turn signal switch device according to the first aspect of the present invention comprises the housing having the cam surface, the operating lever rotatably supported to the housing, the driving unit that maintains the operating lever to be in the neutral position and the operating position in cooperation with the cam surface, the first lever that rotates while abutting on the canceling protrusion of the handle, the first elastic member that elastically force the first lever toward the rotation orbit of the canceling protrusion, and the second lever that returns the operating lever from the operating position to the neutral position by interlocking with the rotation of the first lever. The first lever recedes outside the rotation orbit of the canceling protrusion against the elastic force of the first elastic member by the operating lever when the operating lever is in the neutral position, and the first lever enters the rotation orbit of the canceling protrusion by the force applied by the first elastic member, when the operating lever is in the operating position, the first and second shafts are formed in the housing. The first lever is provided in the first shaft to be rotatable and to proceed to and recede from the rotation orbit of the canceling protrusion. The second lever is rotatably provided in the second shaft. The first lever and the second lever are rotatably connected to each other. Furthermore, the second elastic member is provided in the housing together with the first elastic member. When the operating lever is in the neutral position, the first lever is maintained in the rotation neutral position by the first elastic member, and the second lever is maintained in the rotation neutral position by the second elastic member. Thus, the first and second elastic members that maintain the first and second levers to be in the rotation neutral position are provided in parallel, such that it is possible to simplify the structure and to facilitate assembling. It is possible to significantly reduce a space for the first elastic member that applies force to the first lever compared with the conventional technology, such that it is possible to miniaturize the device. The first and second levers are maintained in the rotation neutral position by the force applied by the first and second elastic members, such that it is possible to disperse the stress of the spring applied to one of the first and second levers, and to prolong the expected life span of the turn signal switch device.

The turn signal switch device according to the second aspect of the present invention comprise the housing having the cam surface, the operating lever rotatably supported to the housing, the driving unit that maintains the operating lever to be in the neutral position and the operating position in cooperation with the cam surface, the first lever that rotates while abutting on the canceling protrusion of the handle, the elastic member that elastically force the first lever toward the rotation orbit of the canceling protrusion, and the second lever that returns the operating lever from the operating position to the neutral position by interlocking with the rotation of the first lever. In the structure of the turn signal switch device, the first lever recedes outside the rotation orbit of the canceling protrusion against the elastic force of the first elastic member by the operating lever when the operating lever is in the neutral position, and the first lever enters the rotation orbit of the canceling protrusion by the force applied by the elastic member when the operating lever is in the operating position, the intermediate support member is provided in the housing of the turn signal switch device, and the opening and the first and second shafts are formed in the intermediate support member. In a state where the cam portion that protrudes from the first lever, passes through and is inserted into the opening on one surface of the intermediate support member, the first lever is axially supported to the first shaft to rotate and slide, and the connecting pin that protrudes from the second lever is connected to the first lever, such that the first lever can rotate and slide with respect to the connecting pin. The second lever is rotatably and axially supported to the second shaft and the holder having the cam portion driven by the operating lever is arranged on the other surface of the intermediate support member, such that the cam of the holder is engaged with the cam portion of the first lever that passes through and is inserted into the opening. In the state where the opening of the intermediate support member corresponds to the cam portion of the movable member arranged on the bottom surface of the holder driven by the operating lever, the intermediate support member is provided on the holder and the cam portion of the movable member is engaged with the cam portion of the first lever in a predetermined position to attach the first lever to the second lever. Thus, it is possible to easily and surely perform assembling and it is not necessary to confirm whether the first lever is attached to the second lever after the assembling.

What is claimed is:

1. A turn signal switch device comprising a housing having a cam surface, an operating lever rotatably supported to the housing, a driving unit for maintaining the operating lever to be in a neutral position and an operating position in cooperation with the cam, a first lever for rotating while abutting on a canceling protrusion of a handle, a first elastic member for elastically forcing the first lever toward a rotation orbit of the canceling protrusion, and a second lever for returning the operating lever from the operating position to the neutral position by interlocking with the rotation of the first lever, wherein the first lever recedes outside the rotation orbit of the canceling protrusion against the elastic force of the first elastic member by the operating lever when the operating lever is in the neutral position, and the first lever enters the rotation orbit of the canceling protrusion by the force applied by the first elastic member when the operating lever is in the operating position, wherein first and second shafts are formed in the housing,
wherein the first lever is provided in the first shaft to be rotatable, and to proceed to and recede from the rotation orbit of the canceling protrusion,
wherein the second lever is rotatably provided in the second shaft,
wherein the first lever and the second lever are rotatably connected to each other,
wherein the second elastic member is provided in the housing together with the first elastic member, and
wherein, when the operating lever is in the neutral position, the first lever is maintained in the rotation neutral position by the first elastic member, and the second lever is maintained in the rotation neutral position by the second elastic member.

2. The turn signal switch device according to claim 1, wherein a connecting unit between the first lever and the second lever is positioned to be closer to the rotation orbit of the canceling protrusion than the first and second shafts.

3. The turn signal switch device according to claim 1, wherein the first elastic member and the second elastic member are made of a thin plate-shaped plate spring having flat plate portion and are arranged to be parallel in the housing.

4. The turn signal switch device according to claim 2, wherein the first elastic member and the second elastic member are made of a thin plate-shaped plate spring having flat plate portion and are arranged to be parallel in the housing.

5. The turn signal switch device according to claim 3,
wherein a first flat portion is formed in one end of the first lever,
wherein a flat plate portion of the first elastic member abuts on the first flat portion,
wherein a second flat portion is formed in one end of the second lever, and
wherein a flat plate portion of the second elastic member abuts on the second flat plate, such that the first lever and the second lever can be maintained in the rotation neutral position.

6. The turn signal switch device according to claim 4,
wherein a first flat portion is formed in one end of the first lever,
wherein a flat plate portion of the first elastic member abuts on the first flat portion,
wherein a second flat portion is formed in one end of the second lever, and
wherein a flat plate portion of the second elastic member abuts on the second flat portion, such that the first lever and the second lever can be maintained in the rotation neutral position.

7. A turn signal switch device comprising a housing having a cam surface, an operating lever rotatably supported to the housing, a driving unit for maintaining the operating lever to be in a neutral position and an operating position in cooperation with the cam surface, a first lever rotating while abutting on a canceling protrusion of a handle, an elastic member for elastically forcing the first lever toward a rotation orbit of the canceling protrusion, and a second lever for returning the operating lever from the operating position to the neutral position by interlocking with the rotation of the first lever, wherein the first lever recedes outside the rotation orbit of the canceling protrusion against the elastic force of the elastic member by the operating lever when the operating lever is in the neutral position, and the first lever enter the rotation orbit of the canceling protrusion by the force applied by the elastic member when the operating lever is in the operating position, wherein an intermediate support member is provided in the housing, wherein an opening and first and second shafts are formed in the intermediate support member, wherein, in a state where the cam portion protruding from the first lever, passes through and is inserted into the opening on one surface of the intermediate support member, the first lever is axially supported to the first shaft to rotate and slide, and a connecting pin protruding from the second lever is connected to the first lever, such that the first lever can rotate and slide with respect to the connecting pin, wherein the second lever is rotatably and axially supported to the second shaft, wherein the holder having the cam portion driven by the operating lever, is arranged on the other surface of the intermediate support member, and wherein the cam portion of the holder is engaged with the cam portion of the first lever passing through and is inserted into the opening.

8. The turn signal switch device according to claim 7,
wherein the housing comprises a first case and a second case having openings on the surfaces facing each other,
wherein the intermediate support member is interposed between the first case and the second case,
wherein the operating lever and the holder are arranged in the first case, and
wherein the first lever and the second lever are arranged in the second case with the intermediate support member interposed between the first case and the second case.

9. The turn signal switch device according to claim 7,
wherein the elastic member is made of a thin plate-shaped plate spring having a flat plate portion, and
wherein the plate spring is arranged on one surface to which the first lever of the intermediate support member is axially supported.

10. The turn signal switch device according to claim 8,
wherein the elastic member is made of a thin plate-shaped plate spring having a flat plate portion, and
wherein the plate spring is arranged on one surface to which the first lever of the intermediate support member is axially supported.

* * * * *